United States Patent [19]

Chszaniecki et al.

[11] Patent Number: 4,786,180

[45] Date of Patent: Nov. 22, 1988

[54] BACK-PRESSURE BEARING ARRANGEMENT FOR TWIN-SCREW EXTRUSION DEVICES

[75] Inventors: Siegfried Chszaniecki, Hanover; Manfred Dienst, Burgdorf, both of Fed. Rep. of Germany

[73] Assignee: Hermann Berstorff Maschinenbau GmbH, Hanover, Fed. Rep. of Germany

[21] Appl. No.: 53,124

[22] Filed: May 22, 1987

[30] Foreign Application Priority Data

May 23, 1986 [DE] Fed. Rep. of Germany ....... 3617379

[51] Int. Cl.[4] ............................................. B29B 7/18
[52] U.S. Cl. ................................. 366/83; 74/606 R; 366/297; 425/376.1
[58] Field of Search ................................. 366/83–84, 366/85, 292, 297, 298, 299, 300, 301; 384/202, 438, 439; 425/376 R; 74/410, 606 R, 665 GA

[56] References Cited

U.S. PATENT DOCUMENTS

| | | | |
|---|---|---|---|
| 3,132,739 | 5/1964 | Jakobsson et al. | 366/301 |
| 3,547,261 | 12/1970 | Koch | 366/85 |
| 3,894,725 | 7/1975 | Schafer | 366/84 |
| 4,033,556 | 7/1977 | Anders | 366/79 |
| 4,599,002 | 7/1986 | Gutknecht | 366/85 |

FOREIGN PATENT DOCUMENTS 2257158 6/1979 Fed. Rep. of Germany .

Primary Examiner—Harvey C. Hornsby
Assistant Examiner—Corinne M. Reinckens
Attorney, Agent, or Firm—Foley & Lardner, Schwartz, Jeffery, Schwartz, Mack, Blumenthal & Evans

[57] ABSTRACT

A back-pressure bearing arrangement for a twin-screw extrusion device which prevents any back-pressure forces from affecting a gear arrangement used for driving the screws. By disposing the back-pressure bearings between the gear arrangement and the housing of the extrusion device and by providing a bearing plate, which is supported by adjustment bolts or tension rods, the bearings are frictionally disconnected from the gear arrangement housing and the back-pressure forces of the screw shafts are effectively prevented from adversely affecting the gear arrangement.

4 Claims, 2 Drawing Sheets

4,786,180

BACK-PRESSURE BEARING ARRANGEMENT FOR TWIN-SCREW EXTRUSION DEVICES

FIELD OF THE INVENTION

The present invention relates to a back-pressure bearing arrangement for twin-screw extrusion devices. More particularly, the present invention relates to a back-pressure bearing arrangement for twin-screw extrusion devices of the type which have two driven screw shafts and in which the back-pressure forces are absorbed by a bearing plate and are transmitted to the housing of the extrusion device through the intermediary of adjustment bolts or tension rods which are screw-threadedly connected to such housing.

BACKGROUND OF THE INVENTION AND PRIOR ART DISCUSSION

A bearing arrangement which is generally of the above-described type is disclosed in German Patent Specification No. 2257158. In such an arrangement, the back-pressure forces emanating from the screws are conducted through a gear arrangement and are then absorbed by an axial bearing which is screw-connected to the gear housing. The axial bearing is, itself, disposed in a housing which is mounted on an intermediate plate-screw-connected to the gear housing.

The back-pressure of the screws is transmitted from the back-pressure bearing to the gear housing through the intermediary of the intermediate plate in the event of longitudinal expansion of the adjustment bolts. The provision of a free space or gap on the opposite side of the gear housing, that is to say, between the gear housing and the housing for the extrusion device, does not prevent the back-pressure forces of the screws from entering the gear housing when longitudinal expansion of the tension rods or adjusting bolts occurs. This is because the housing of the back-pressure bearing is connected to the gear housing through the intermediary of the intermediate plate. If the back-pressure forces enter the gear housing, the housing becomes distorted and, in consequence, the bearings for the various gear wheels disposed therein also become slightly deformed. This impairs the meshing between the toothed wheels and pinions and causing increased wear on the toothed wheels. In addition, back-pressure bearings which are flange-mounted on the gear housing increase the overall length of the structure and make the gear more expensive.

It is also disadvantageous to conduct the back-pressure forces of the screws initially through the gear so that they then return through the gear housing to the housing of the extrusion device through the intermediary of spacer bolts, tension rods or adjustment bolts. This measure makes the bearing arrangement very complex and extremely expensive.

OBJECT OF THE INVENTION

The present invention seeks to provide a back-pressure bearing arrangement which positively prevents the back-pressure forces of the screws from entering the gear housing and which also permits the overall sizes of the gear and back-pressure bearing to be reduced, thereby reducing the overall cost.

SUMMARY OF THE INVENTION

According to the present invention there is provided a back-pressure bearing arrangement for a twin-screw extrusion device, said extrusion device comprising a housing, two screw shafts rotatably mounted in said housing, and a gear arrangement driving said shafts, said bearing arrangement comprising adjustment bolts connected by screws to said extrusion device housing, each said adjustment bolt having a first end region, bearing plate means receiving said first end regions of said bolts, and back-pressure bearings disposed on said bearing plate, said back-pressure bearings receiving said shafts, whereby said bearings are disposed between said gear arrangement and said extrusion device housing and frictionally disconnected from said gear arrangement.

The fact that the bearing, which absorbs the back-pressure forces of the screws, is disposed between the gear arrangement and the housing of the extrusion device and is frictionally disconnected from the gear means that there is no possibility of the back-pressure forces having adverse effects on the gear arrangement. The tension rods or adjustment bolts accommodate the back-pressure bearings directly in a receiver plate and conduct the back-pressure forces to the housing of the extrusion device, more specifically, to a flange portion of the extrusion device, over the shortest distance and without the necessity of the forces having to be conducted through a gear. Thus, the back-pressure forces are prevented from having any frictional influence on the gear arrangement itself.

The bearing plate, which receives the back-pressure bearings may be retained in position solely by the tension rods or adjustment bolts. This ensures that the back-pressure forces are satisfactorily transmitted to the housing of the extrusion device whilst using a minimum number of component parts.

In order to provide a sealed housing both for the back-pressure bearings and for the gear, the back-pressure bearings may be disposed together in a common housing with the gear, but the bearing plate for the back-pressure bearings is maintained frictionally disconnected from the housing. In order to facilitate the assembly of the bearing plate with the back-pressure bearings and the tension rods, the plate may be disposed on a separate web/crosspiece member/flange in the gear, the plate itself being frictionally disconnectable from the gear flange so as to ensure that no back-pressure forces are transmitted to the gear housing.

BRIEF DESCRIPTION OF THE DRAWINGS

Two embodiments of the arrangement of the present invention will be further described, by way of example, with reference to the accompanying drawings, in which.

DESCRIPTION OF PREFERRED EMBODIMENTS

Figure 1:
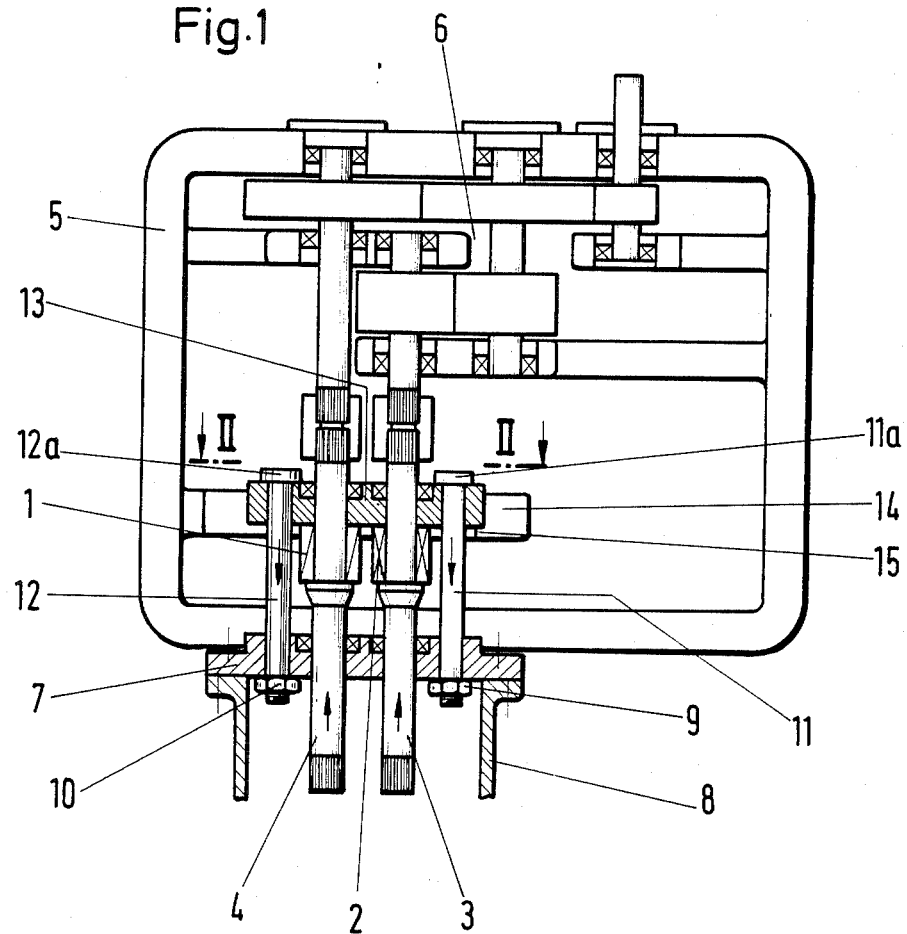
FIG. 1 is a longitudinal sectional view through an arrangement of a back-pressure bearing and a gear arrangement disposed in a common housing.

The embodiment illustrated in FIG. 1 shows the two shafts 3 and 4 of a twin-screw extruder which are disposed in back-pressure bearings 1 and 2 respectively. The bearings 1 and 2 are disposed in a housing 5 which is shared with a gear arrangement 6. The extruder has a housing 8 terminating in a flange cover 7. Tension rods or adjustment bolts 11 and 12 are screw-connected to the flange cover 7 of the housing 8 by means of nuts 9 and 10. Projection members 11a and 12a are provided on the ends of the bolts 11 and 12 facing the gear arrangement 6. These members support or retain a bearing plate 13 for the back-pressure bearings 1 and 2.

The bearing plate 13 abuts against a shoulder portion 15 of a mounting flange or web member 14 secured to the housing 5. However, since the back-pressure forces of the screw shafts act in a direction away from the shoulder portion 15, there is no frictional connection between the bearing plate 13 or the adjustment bolts 11 and 12 and the gear housing 5.

The back-pressure forces, set up by the conveyancing of the material in the screw threads (not shown), are transmitted from the screw shafts 3 and 4 in a direction opposite to that of the conveying direction of the screws of the extrusion device towards the back-pressure bearings 1 and 2.

The force is then transmitted from the back-pressure bearings 1 and 2 to the bearing plate 13 and then through the tension rods 11 and 12 back to the flange cover 7 of the housing 8 of the extrusion device. The gear arrangement is therefore unaffected by these forces.

Figure 2:
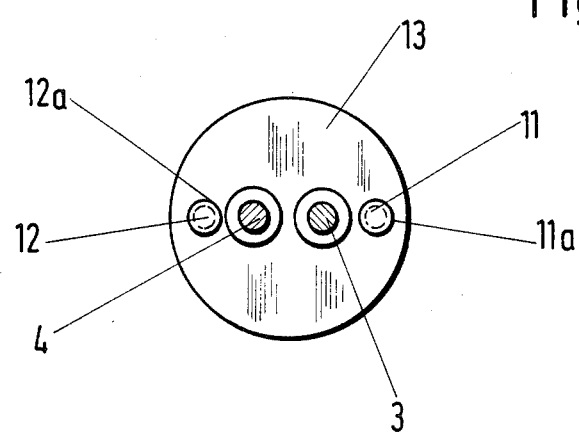
FIG. 2 is a cross-sectional view taken along the line II—II of FIG. 1.
Figure 3:
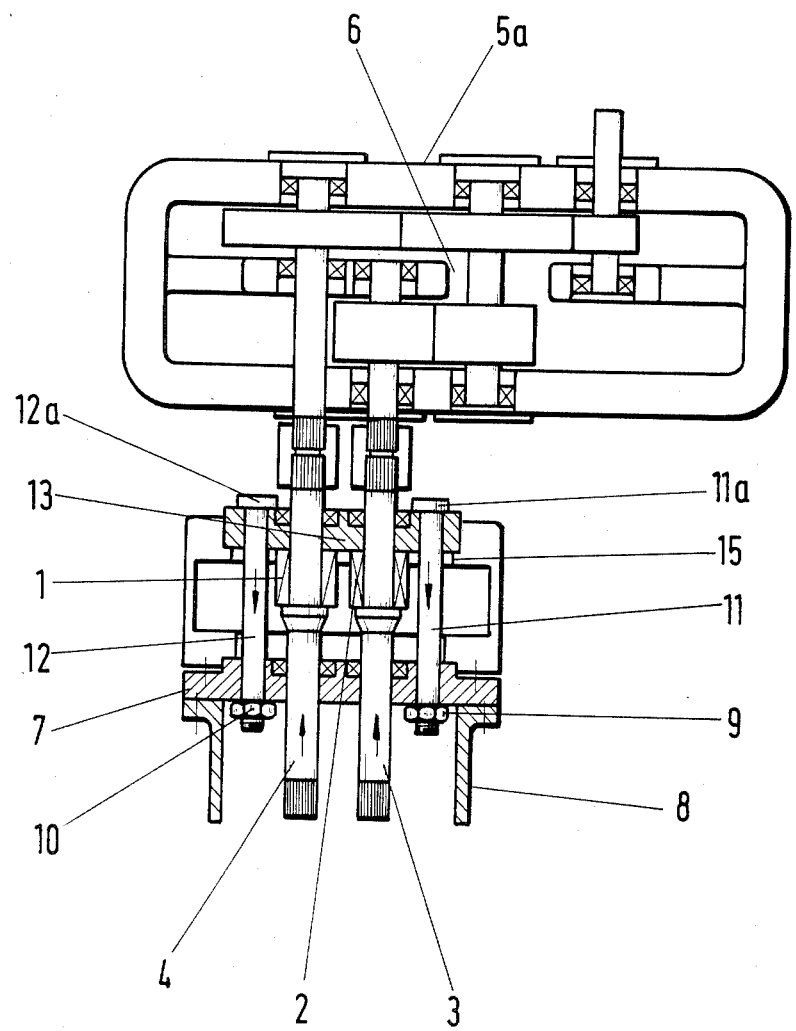
FIG. 3 is a longitudinal sectional view through a second embodiment of a back-pressure bearing.

The embodiment illustrated in FIG. 3 differs from that shown in FIGS. 1 and 2 in that the back-pressure bearings 1 and 2 are disposed in the bearing plate 13 which is located externally of a separate housing 5a for the gear arrangement. The path of the back-pressure forces is identical to that described hereinbefore with reference to FIGS. 1 and 2 and, again, the gear arrangement is not affected by such forces.

The advantages that such arrangement in accordance with the present invention appear to provide over the prior art arrangements are numerous. Firstly, no back-pressure forces can enter the gear housing, because there is no frictional connection between any integer transmitting the forces and such housing, secondly, only short adjustment bolts or tension rods are required.

There is also no need to provide expensive hollow shafts for receiving the adjustment bolts or tension rods. In any case, the provision of hollow shafts for the mounting of large toothed wheels is not advantageous.

The back-pressure bearing is not flange-mounted on the rear side of the gear housing, so that the overall size of the gear arrangement is reduced. Finally, any longitudinal expansion of the adjustment bolts or tension rods cannot be transmitted to the gear housing.

We claim:

1. A back pressure bearing arrangement for a twin-screw extrusion apparatus comprising:
    (a) an extrusion housing having an end wall including an inner surface facing an extrusion chamber,
    (b) a pair of screw shafts rotatably mounted in said extrusion housing,
    (c) gear housing means including a gear arrangement for rotatably driving said screw shafts,
    (d) bearing plate means mounted between said extrusion housing and said gear housing means and formed with openings through which said screw shafts extend for driving connection with said gear arrangement, said bearing plate means including a first surface facing said gear arrangement and an opposed, second surface facing said extrusion housing,
    (e) adjustment bolts interposed between said bearing plate means and said end wall, each said adjustment bolt having a first end portion separate from, but adapted to engage said first surface of said bearing plate means, and a second end secured to means separate from but engageable with said inner surface of said end wall of said extrusion housing, said adjustment bolts being connected only between said bearing plate means and said end wall, and
    (f) back-pressure bearings positioned around both of said shafts and adapted to engage said second surface of said bearing plate means, said shafts being formed so as to contact said bearings when back-pressure forces are exerted on said shafts in the direction of said gear arrangement during operation of said apparatus,
    whereby said back-pressure forces exerted on said shafts are transmitted sequentially to said bearing plate means, said adjustment bolts and said end wall of said extrusion housing, thereby preventing such forces from acting on said gear arrangement.

2. The bearing arrangement of claim 1, wherein said gear arrangement, said bearing plate means and said back-pressure bearings are located in a common housing.

3. The bearing arrangement of claim 2, wherein said bearing plate means is positioned on a web member secured to said housing and extending inwardly from a side wall thereof, said web member being formed with a shoulder portion against which said second surface of said bearing plate means is positioned.

4. The bearing arrangement of claim 1, wherein said gear arrangement is contained in a gear housing, said bearing plate means and said back-pressure bearings being located exteriorly of said gear housing.

* * * * *